United States Patent [19]

Laurito

[11] 3,993,626

[45] Nov. 23, 1976

[54] PRODUCTION OF ETHYL CELLULOSE-COMPATIBLE PHENOL-MODIFIED HYDROCARBON RESINS FOR USE IN PRINTING INKS

[75] Inventor: James J. Laurito, Coraopolis, Pa.

[73] Assignee: Neville Chemical Company, Pittsburgh, Pa.

[22] Filed: Dec. 12, 1974

[21] Appl. No.: 532,229

[52] U.S. Cl. .............................. 260/47 UA; 260/62; 106/191; 260/DIG. 38

[51] Int. Cl.[2] ..................... C09D 11/10; C08F 32/06

[58] Field of Search .............. 260/47 UA, 47 UP, 62

[56] References Cited

UNITED STATES PATENTS

| | | | |
|---|---|---|---|
| 3,645,970 | 2/1972 | Kleiner | 260/47 UA |
| 3,649,705 | 3/1972 | Waranius | 260/669 P |

FOREIGN PATENTS OR APPLICATIONS

| | | |
|---|---|---|
| 2,150,216 | 4/1973 | Germany |

OTHER PUBLICATIONS

Chemical Abstracts — vol. 79, 1973; — Entry No. 55064K.

*Primary Examiner*—Joseph L. Schofer
*Assistant Examiner*— Kulkusky
*Attorney, Agent, or Firm*—Burns, Doane, Swecker & Mathis

[57] ABSTRACT

Ethyl cellulose-compatible phenol-modified hydrocarbon resins are produced by polymerizing a reaction mixture containing indene, vinyl toluene, and dicyclopentadiene as the essential polymerizable constituents in the presence of a phenol compound and a Friedel-Crafts type catalyst such as boron trifluoride phenol complex. The phenol-modified hydrocarbon resin has a ring and ball softening point of above about 120° C, a solution viscosity (Gardner-Holdt, sec.) of between about 0.7 and about 15, a hydroxyl number of above about 10, and is ethyl hydroxyethyl cellulose compatible as well as ethyl cellulose compatible. Thus, these resins are particularly useful as replacements for rosin and rosin derivatives in rotogravure printing ink.

6 Claims, No Drawings

PRODUCTION OF ETHYL CELLULOSE-COMPATIBLE PHENOL-MODIFIED HYDROCARBON RESINS FOR USE IN PRINTING INKS

BACKGROUND OF THE INVENTION

1. Field of the Invention

This invention relates generally to synthetic hydrocarbon resin compositions, their production, and their uses in printing ink compositions.

2. Summary of the Prior Art

Printing ink is a fluid or semifluid colored material consisting of a color body and a carrying vehicle. The carrying vehicle is necessary to distribute the color body on the printing press.

Rosin, modified rosin, and certain natural resins have been used extensively as carrying vehicles. However, the decrease in the availability of rosin and the increased use of printing inks has created an increasing need for a synthetic replacement for rosin in printing inks, especially rotogravure printing inks. Synthetic resins, especially synthetic hydrocarbon resins, may be used as synthetic replacements.

Such a synthetic resin must have the following properties.

1. high resin softening point,
2. sufficient solubility in the printing ink solvent,
3. fast drying speed,
4. sufficient color dispersibility,
5. fine gloss
6. sufficient viscosity stability, and
7. sufficient compatibility with printing ink additives.

Hydrocarbon resins suitable for a wide variety of end uses including printing ink compositions have been known for many years. See U.S. Pat. Nos. 2,598,424; 3,290,275; 3,299,034; 3,468,837; 3,523,095; 3,753,693; and 3,775,381; and "Recent Developments in Hydrocarbon Resins", K. E. Jackson, Official Digest, pp. 372–385, May 1956; and "Synthetic Resins for Inks", John P. Petrone, *The American Ink Maker*, Vol. 49 March – October 1971).

Printing ink additives such as ethyl cellulose and ethyl hydroxyethyl cellulose promote ink film adhesion, toughness, gloss, and scuff or rub resistance. Thus, it is necessary that the hydrocarbon resins used in printing inks be compatible with these additives. U.S. Pat. No. 3,753,963 discloses, in general, the production of a hydrocarbon resin, which resin is presently thought to be compatible with ethyl hydroxyethyl cellulose, but which resin lacks compatibility with ethyl cellulose.

Thus, the search has continued for new synthetic resins having improved properties, particularly in the printing ink industry which has searched for a suitable replacement for rosin and rosin derivatives in rotogravure printing ink compositions. The present invention was made as a result of this search.

OBJECTS AND SUMMARY OF THE INVENTION

Accordingly, a primary object of the present invention is to provide novel synthetic resins suitable for use in compositions such as printing inks.

Another object of the present invention is to provide such novel printing ink compositions.

Still another object of the present invention is to provide novel processes for producing synthetic resins suitable for use in compositions such as printing inks.

These and other objects will be apparent to one skilled in this art from the following:

In accordance with a primary aspect of the present invention, an ethyl cellulose-compatible phenol-modified hydrocarbon resin is provided or produced which has a polymerized indene content of from about 10% to about 70% by weight, a polymerized vinyl toluene content of from about 10% to about 50% by weight, a polymerized dicyclopentadiene content of from about 5% to about 50% by weight, and a phenol compound content of from about 1% to about 20% by weight. This resin also has a ring and ball softening point of above about 120° C, a solution viscosity (Gardner-Holdt, sec.) of between about 0.7 and about 15, a hydroxyl number of above about 10, and is both ethyl cellulose compatible and ethyl hydroxyethyl cellulose compatible.

In accordance with another aspect of the present invention, an ethyl cellulose-compatible phenol-modified hydrocarbon resin is produced or provided by a process which includes polymerizing a reaction mixture comprising as polymerizable constituents above about 10% by weight indene, above about 10% by weight vinyl toluene, and above about 5% by weight dicyclopentadiene (based upon the total weight of polymerizable components plus the phenol compound) in the presence of above about one percent by weight of a phenol compound (based upon the total weight of the polymerizable components plus the phenol compound) and a catalytic amount of an acid-acting Friedel-Crafts type catalyst, wherein the above polymerizable constituents comprise above about 40% by weight of the polymerizable constituents in the reaction mixture, (b) removing the catalyst from the reaction mixture, and (c) recovering the phenol-modified hydrocarbon resin from the reaction mixture.

The present invention also provides novel printing ink compositions prepared from these phenol-modified hydrocarbon resins.

A primary feature of the present invention is the surprising discovery of these novel phenol-modified hydrocarbon resins of the present invention which advantageously possess a high resin softening point, solubility in printing ink solvents and compatibility with ethyl cellulose- or ethyl hydroxyethyl cellulose-based rotogravure inks.

Another primary aspect of the present invention is the discovery that the novel phenol-modified hydrocarbon resins of the present invention not only have improved solvent release properties but also have good colorant dispersability and produce a fine gloss when used in rotogravure inks.

Other aspects and advantages of the present invention will become apparent to one skilled in the art from the following description of the preferred embodiments.

DESCRIPTION OF THE PREFERRED EMBODIMENTS

As indicated above, the hydrocarbon resins of the present invention are produced by reacting or polymerizing a mixture containing indene, vinyl toluene, and dicyclopentadiene as polymerizable constituents or monomers in the presence of a phenol compound and a Friedel-Crafts type catalyst.

The term "polymerizable constituents" is used herein to include not only indene, vinyl toluene, and dicyclopentadiene, but also those compounds or monomers which may be polymerized along with indene, vinyl toluene, and dicyclopentadiene during the polymerization process of the present invention.

Non-limiting examples of other polymerizable constituents which may be used in the reaction mixture, in addition to indene, vinyl toluene, and dicyclopentadiene, include derivatives of indene (e.g., lower alkyl indenes such as methyl indene), and derivatives of dicyclopentadiene (e.g., lower alkyl dicyclopentadienes such as methyl dicyclopentadiene), as well as other polymerizable constituents such as coumarone, divinyl benzene, styrene, ethyl styrene, alpha-methyl styrene, beta-methyl styrene, and dimethyl styrene.

The indene, vinyl toluene, and dicyclopentadiene are each well known per se and the manner in which they are produced, derived or obtained is not a part of the present invention. The terms 37 indene", "vinyl toluene", and "dicyclopentadiene" are meant to refer to the unsubstituted compounds and do not include derivatives of these compounds.

Indene may be used in the present invention in a substantially pure state, i.e., containing from 95 to essentially 100% indene and its alkyl derivatives, or as an indene-rich hydrocarbon fraction.

The vinyl toluene used in the polymerizable reaction mixture may be essentially pure vinyl toluene. The ortho, meta, and para isomers of vinyl toluene may be used singularly or in any combinations thereof in any proportions.

Dicyclopentadiene is also well known per se. A substantially pure, e.g., 95 to essentially 100%, dicyclopentadiene feedstock may be used. Alternatively, dicyclopentadiene-rich hydrocarbon fractions may also be used. Typically, such dicyclopentadiene-rich hydrocarbon fractions contain at least about 40%, and more typically at least about 70% dicyclopentadiene and minor amounts, e.g., from about 1 to about 30%, of methyl dicyclopentadiene and codimers of cyclopentadiene and methylcyclopentadiene.

The indene, vinyl toluene, and dicyclopentadiene monomers comprise generally above about 40%, and more typically above about 60%, by weight of the total amount of polymerizable constituents of the reaction mixture.

The source of indene, dicyclo pentadiene and vinyl toluene may, of course, be thermally cracked petroleum fractions or mixtures of such fractions.

Thus, the principal polymerizable constituents (indene, vinyl toluene, and dicyclopentadiene) and any other polymerizable constituents are fed or introduced into a reactor or reaction zone in proportions which may vary widely. The weight ratio of indene to vinyl toluene may be from about 1 to 5 to about 5 to 1, and more typically from about 1 to 3 to about 3 to 1, and the weight ratio of indene to dicyclopentadiene may be from about 1 to 5 to about 10 to 1, and more typically from about 1 to 2 to about 5 to 1, and the weight ratio of vinyl toluene to dicyclopentadiene may be from about 1 to 5 to about 10 to 1, more typically from about 1 to 2 to about 5 to 1.

The reaction mixture may comprise, for example, above about 10%, e.g., from about 10% to about 50%, preferably from about 20% to about 40%, indene, above about 10%, e.g., from about 10% to about 70%, more typically, and preferably from about 20% to about 40%, vinyl toluene, above about 5%, e.g., from about 5% to about 50%, preferably from about 5% to about 30%, dicyclopentadiene, and up to about 60%, e.g., from about 1% to about 40%, of other polymerizable monomers or constituents.

The expressed percentages are by weight of the total amount of polymerizable monomers plus phenol in the reaction mixture, and exclude any solvent or diluent or other non-polymerizable constituent which may be present in the reaction mixture or zone.

The phenol compound used to modify the hydrocarbon resins may be any aromatic organic compound in which one or more hydroxy groups are attached directly to an aromatic ring. Examples of phenols include phenol itself (i.e., hydroxybenzene), lower alkyl derivatives of phenol such as the cresols, xylenols, and p-tert-butyl phenol, resorcinol, pyrocatechol, hydroquinone, and naphthols, and lower alkyl derivatives thereof. Phenol itself is a particularly preferred phenol compound. All or a portion of the phenol compound may, if desired, be added to the reaction mixture as a phenol complex, such as a boron trifluoride phenol complex, so as to generate phenol compound in situ in the reaction mixture.

In preparing the phenol-modified hydrocarbon resins of the present invention, there is employed a phenol compound in an amount of generally above about one percent, typically from about 1% to about 20%, more typically from about 2% to about 10%, and preferably from about 4% to about 8%, by weight of the total amount of polymerizable monomers plus phenol compound. The resulting phenol-modified hydrocarbon resins generally contain from about 1% to about 20%, typically from about 2% to about 10%, and preferably from about 4% to about 8%, by weight phenol compound based on the total weight of the hydrocarbon resin.

Larger amounts of phenol compound may result in hydrocarbon resins whose softening points are undesirably low whereas smaller amounts of phenol compound may result in resins having poor ethyl cellulose and/or ethyl hydroxyethyl cellulose compatibility.

Typically, the reaction mixture is polymerized in the presence of up to about 80%, typically from about 20% to about 80%, and preferably from about 50% to about 65%, of inert hydrocarbon material as a diluent or solvent. The expressed percentages are by weight of the total reaction mixture, i.e., the total of the polymerizable and non-polymerizable constituents.

The diluent or solvent is non-polymerizable, i.e., substantially free from resin-forming constituents which may cause discoloration in the resulting resin, under the conditions of polymerization of the present invention, but minor portions thereof may be incidentally incorporated into the resulting hydrocarbon resin such as by alkylation. Typically, the diluent is a non-olefinic aliphatic or aromatic hydrocarbon composition which is in the liquid state under the conditions of polymerization. Preferably, the diluent is a $C_6$–$C_{10}$ aromatic hydrocarbon such as benzene, ethyl benzene, toluene, ethyl toluene, xylene, indane, cumene or trimethylbenzene. The diluent may also be selected from the solvents for the resulting resins such as aliphatic and aromatic solvents, e.g., benzene, toluene, xylene, petroleum base solvent naphtha and mineral spirits.

In general any Friedel-Crafts type catalyst may be used in the process of the present invention. The term "Friedel-Crafts type catalyst" includes Friedel-Crafts catalysts per se such as Friedel-Crafts metal halides, e.g., boron trifluoride, stannic chloride, aluminum chloride, aluminum bromide, titanium tetrachloride, zinc chloride, ferric chloride, vanadium chloride, and phosphorus pentachloride.

The term Friedel-Crafts type catalyst also includes inorganic halide complex combinations in which the inorganic halide is combined in a molecular association with an organic compound. The latter organic compounds which form catalytic molecular association complexes with the inorganic Friedel-Crafts halides are generally selected from the organic oxygen-containing compounds such as the phenols, the ketones, the alcohols, the carboxylic acids, the ethers, the esters, the organic nitro compounds, and others generally known to be capable of combining with the metal halides to form these catalytic complexes. Complexes of the latter type include the phenolates, etherates, alcoholates and ketonates.

For example, boron trifluoride either as a gas, or as solid or liquid complexes of boron trifluoride with a wide variety of organic compounds such as, for example, acetic or propionic acid, dialkyl ethers such as methyl ethyl ether, ethyl ether, and propyl ethers, lower alkyl alcohols and esters, and the like, as well as various boron trifluoride hydrates, may be used.

Most preferably, boron trifluoride phenol complexes are used in the process of the present invention insofar as they have been found to give particularly advantageous results.

In the broader aspects of the present invention, any catalytic amount of catalyst may be used. For example, the amount of catalyst may range from about 0.01% up to about 10%. More typically, catalyst may be used in an amount of from about 0.1% to about 5%, and preferably from about 1% to about 1.5%. These percentages are by weight of the total reaction mixture, i.e., including both polymerizable and non-polymerizable constituents including any diluent or solvent.

Larger amounts of catalyst may result in darker colored resins whereas smaller amounts of catalyst may result in resins of lower softening point.

For ease of addition, the catalyst may conveniently be made up as a liquid solution or dispersion in a portion of the solvent or diluent.

Any order of mixing the catalyst, phenol compound and raw material feed may be used in the process of the present invention. For example, the catalyst may be added to the mixture of polymerizable monomers and phenol compound, or a mixture of phenol compound and catalyst may be added to the mixture of polymerizable monomers or the phenol compound and catalyst may be separately but simultaneously, added to the mixture of polymerizable monomers.

The polymerization reaction may be conducted over a wide range of temperatures depending upon the type of catalyst chosen and other process parameters as can be seen by one skilled in the art in view of the disclosure herein. For example, temperatures from about −50° C to about 150° C, more typically from about 10° C to about 100° C, and preferably from about 40° C to about 50° C may be used. Higher reaction temperatures may yield hydrocarbon resins with darker colors and lower softening points, whereas lower reaction temperatures tend to decrease reactivity and thus may result in resins having lower hydroxyl numbers and lower ethyl cellulose and/or ethyl hydroxyethyl cellulose compatibility.

Preferably, the polymerization reaction is carried out under substantially anhydrous conditions and the reactants should be kept substantially water-free.

The pressures employed are not thought to be critical. Subatmospheric, atmospheric, and superatmospheric pressures may thus be employed. Pressures sufficient to prevent substantial loss by evaporation of the reactants and/or diluent are typically used.

Any conventional stirred or non-stirred reactor vessel may be employed for the polymerization reaction and the process of the present invention may be conducted in a batch, semi-continuous, or continuous manner. Preferably, the polymerization reaction is carried out under agitation, e.g., in a stirred reaction vessel.

The polymerization reaction is typically maintained at reaction temperature until the desired degree of polymerization is attained. For example, significant yields of desired resin or polymer may be obtained after a reaction time of generally from about 0.1 to about 20 hours, typically from about 3 to about 4 hours. Longer reaction times tend to produce resins of darker color and lower softening point whereas shorter reaction times tend to produce resins of lower hydroxyl number and lower ethyl cellulose and/or ethyl hydroxyethyl cellulose compatability.

The catalyst contained in the resulting phenol-modified hydrocarbon resins is typically removed by treating the catalyst containing resin mixture with a clay, e.g., attapulgus clay, or Fuller's earth, or a combination of hydrated lime and clay, to neutralize the catalyst, with the catalyst/clay sludge thereafter being removed by filtration. Caustic or soda ash solutions may also be used to neutralize the catalyst.

The catalyst-free phenol-modified hydrocarbon resins may then be recovered from the reaction mixture by conventional methods such as distillation, e.g., steam distillation or stripping, or other conventional recovery methods known to those skilled in this art.

A process for neutralization and decoloration of polymerized oils is described in U.S. Pat. No. 3,371,075, herein incorporated by reference. Other methods which may be suitable for the recovery of catalysts are described in U.S. Pat. Nos. 2,515,646 and 2,582,525, also herein incorporated by reference.

The yield of the phenol-modified hydrocarbon resins produced in the process of the present invention is defined as the weight of resin produced divided by the total weight of all polymerizable constituents in the feed plus the phenol compound. Using the process of the present invention, a yield of generally above about 60%, and preferably above about 90%, may be obtained.

The polymerized phenol-modified hydrocarbon resins of the present invention have a polymerized indene content of generally from about 10% to about 70%, more typically from about 20% to about 40% a polymerized vinyl toluene content of generally from about 10% to about 50%, and preferably from about 20% to about 40%, and a polymerized dicyclopentadiene content of generally from about 5% to about 50%, and preferably from about 5% to about 30%. These resins also have a phenol compound content of generally from about 1% to about 20%, more typically from about 2% to about 10%, 4% to about 8%, by weight of the final resin.

The ring and ball softening point of the resins is measured in accordance with JIS K2531-1960 (ASTM E28-51T). The resins of the present invention have softening points generally above about 120° C.

The resin color is determined by Barrett visual method No. 106. The resins of the present invention have a color generally less than about 6, typically less than about 3, and preferably less than about 2, on a Barrett scale of from 1 to 10.

The resins of the present invention may also have ink solvent (Magie 535) solubilities generally of from about −30° to about 70°, more typically from about −30° to about 45° (C). (Magie 535 ink solvent is available from Magie Bros. Oil Company, Franklin Park, Illinois, and has an API gravity (ASTM D-287-67) of 36.9; a specific gravity (ASTM D-1298-67) of 0.8049; a refractive index (ASTM D-1218-61) of 1.4648; a flash point (ASTM D-92-66) of 285 F.; a KB No. (ASTM D-1133-61) of 25.4; an Aniline point (ASTM D-1012-62) of 173° F.; a 22% aromatic, a 2% olefins and a 76% paraffins content.

The resins of the present invention may have a degree of unsaturation corresponding to a iodine number of generally from about 25 to about 75, more typically from about 30 to about 70. The iodine number of the resins is determined by a ASTM D-1959 process.

By hydroxyl number is meant the number of milligrams of KOH equivalent to the hydroxyl content of a 1 gram resin sample. Hydroxyl number is determined by acetylating with a 25 Vol.% solution of acetic anhydride in pyridine. The excess is hydrolyzed with water, titrated with standard NaOH solution, and hydroxyl number calculated from the difference in titration of the blank and sample solution (ASTM E-222). The resins of the present invention have hydroxyl numbers of generally above about 10, typically above about 20, and preferably above about 30.

The solution viscosities of the resins of the present invention are measured by the Gardner-Holdt method at 25° C (bubble seconds). When 60% by weight of the resin in 47 Kauri butanol (KB) gravure ink solvent is used, the resins may have solution viscosities of generally from about 0.7 to about 15, more typically from about 1.0 to about 5.

The resins of the present invention have standard Stoddard solubilities (definite cloud points) of generally from about −50° to about 50°, more typically from about −50° to about 25°, C. (For a description of the standard Stoddard solubility test, see U.S. Pat. No. 3,468,837, incorporated herein by reference).

The phenol-modified hydrocarbon resin of the present invention is soluble in a wide variety of solvents including typical aliphatic hydrocarbon solvents such as mineral spirits, and aromatic hydrocarbon solvents such as xylene, high flash naphtha, benzene, and chlorobenzene.

In order to be useful in gravure printing inks, resins must be compatible with ethyl cellulose and ethyl hydroxyethyl cellulose. Compatibility with ethyl cellulose is measured by (a) preparing a 20 part by weight ethyl cellulose (e.g., Hercules N-10 grade) solution in 80 parts by weight of a solvent consisting of 90% by volume toluene and 10% by volume ethanol; (b) preparing a 60 part by weight solution of the resin to be tested in 40 parts by weight Tolusol 25 (42 KB) ink solvent (Tolusol is a trademark for a series of solvents, predominantly $C_7$ hydrocarbons, low in naphthenic hydrocarbons and containing from 3 to 50% aromatics, the balance being essentially paraffinic), (c) blending 50 grams (91%) of the resin solution and 5 grams (9%) of the ethyl cellulose solution, and (d) casting a film on a clear glass plate. The resin is defined as "ethyl cellulose compatible" if the thus formed film is initially clear and remains clear for 2.2 hours at 25° C. Resins which are not compatible with ethyl cellulose result in a hazy or cloudy film.

Compatibility with ethyl hydroxyethyl cellulose is measured by the same manner, except that 10 parts high viscosity ethyl hydroxyethyl cellulose (EHEC) is dissolved in 90 parts by weight Lactol spirits, and 80% of a 60% resin solution in Lactol spirits is blended with about 20% of the EHEC solution prior to casting on the glass plate. (Lactol spirits is 42 KB ink solvent available from AMSCO)

To be used in printing, the resins of this invention are dissolved with an appropriate solvent and carbon black or other desirable colorant and other conventional ingredients such as solid extenders. Auxiliary polymeric binders and other functional organic or inorganic compounds may be included in the vehicle (which is composed of resin dissolved in a hydrocarbon solvent which is usually aliphatic in nature). The preferred solvents for rotogravure printing inks are highly refined hydrocarbon solvents which are relatively low boiling and boil within a relatively narrow range, e.g., between about 90° and 110° C. Particularly preferred are essentially aliphatic solvents which have a Kauri butanol value of 35° to 45° C (as compared to a value of 105 for toluene). In making up an ink composition, the hydrocarbon resin and carbon black or other pigment in powder form may be placed in a ball mill together with the solvent and mixed until a uniform dispersion of the pigment in the hydrocarbon solution is obtained. If desired, it is possible to prepare an ink concentrate in this fashion which may be subsequently diluted with additional solvent, thus making it appropriate for use in the printing operation. Typically, for instance, an ink composition used in a printing operation may contain between about 10% and about 50% of the resin, between about 50 to 100 parts of carbon black or other pigment or colorant per 100 parts of resin, the balance consisting essentially of an aliphatic hydrocarbon solvent.

Resins which are useful in gravure printing inks must pass several performance tests. A formulation which may be used for carrying out these performance tests is as follows:

| Parts by Weight | Components |
|---|---|
| 50 | resin solution which comprises 60 % by weight resin in 42 KB gravure solvent |
| 18 | Tolusol 25 |
| 5 | ethyl cellulose solution which comprises 20 % by weight ethyl cellulose in 90/10 (by volume) toluene/ethanol |
| 10 | "VM + F" naphtha |
| 2 | toluene |
| 15 | pigment (such as red, blue, black, yellow, etc.) |

This formulation is placed in a ball mill and mixed for about 16 hours or until a uniform dispersion of the pigment in the hydrocarbon solvent is obtained. Five performance tests are then conducted on the printing inks as follows:

1. The viscosity of the printing ink is determined according to ASTM-D 1084 (no. 2 Zahn cup). The viscosity of the printing ink of the present invention may be between 10 and 40 seconds, preferably between 20 to 35 seconds. If the viscosity of the printing ink is too high, it can be adjusted by adding more 42 KB solvent (Tolusol 25). If the viscosity of the printing ink is too low, it can be adjusted by reformulating the composition 2. The "fineness of the grind" is measured by ASTM D-1316 (NPIRI Gauge). Printing inks of the present invention have a fineness generally less than about 5, and preferably less than zero on a 10 point scale.

3. The drawdown value (Meyer bar) of a printing ink is an indication of its color, hue, masstone and printone. Drawdown values are measured experimentally by visual comparison to drawdowns of standard gravure inks made with limed rosins.

4. The wettability of the printing inks of the present invention is measured by comparing the appearance of the drawdown. If streaks are present, the printing ink has poor wettability. The amount of "streaking" in turn depends upon the degree of compatability of the resin with ethyl cellulose and/or ethyl hydroxyethyl cellulose. The greater the compatability, the less streaking, and thus the greater the wettability.

The printing inks of the present invention possess excellent wettability.

5. The gloss of a printing ink is measured according to ASTM D-523-67 on a 60° 5% light reflected gloss meter. The printing inks of the present invention have gloss values of generally above about 2, on a scale of 1 to 100.

The present invention is further illustrated by the following examples. All parts and percentages in the examples as well as in the specification and claims are by weight unless otherwise specified.

EXAMPLE I

Runs, 1, 3 to 5, 14, 18 and 20 of this example illustrate the preparation of the phenol-modified hydrocarbon resins of the present invention.

Runs 2C, 6C to 13C, 15C to 17C, 19C and 21C are outside the present invention but are presented for comparison purposes.

The overall procedure for runs 1 to 21 was as follows:

The reaction mixture was formed with 250 grams of total polmerizables in a 500 gram total reaction mixture (including diluent and all inert material), and boron trifluoride phenol complex ($BF_3 - 2C_6H_5OH$) catalyst was continuously added to the reaction mixture under agitation over a timed reaction period at substantially atmospheric pressure until 1.25% catalyst was added. The inert material was mostly benzene, toluene, etheylbenzene, xylenes, n-propylbenzene, ethyltoluenes, trimethylbenzenes, indane, and naphthalene.

The resulting reaction product mixture was pumped while hot (from about 45° to 50° C) to a clay treater and the indicated amount of attapulgus clay or attapulgus clay and lime was added with agitation to neutralize the catalyst. The resulting mixture was then heated at about 55° C to about 60° C for about 0.5 hours and the catalyst sludge was removed by filtration. Diluent and oily hydrocarbons were removed by steam distillation at a temperature of about 240°–250° C. Other data and results are shown in TABLE I.

TABLE I

| Run No. | Phenol,[a] % | Vinyl Toluene,[a] % | Indene,[a] % | Dicyclopentadiene,[a] % | Styrene,[a] % | Other Polymerizables,[a,b] % | Xylol Diluent grams | Reaction Period (hrs.) |
|---|---|---|---|---|---|---|---|---|
| 1 | 6 | 20 | 38.0 | 5 | 2.5 | 28.5 | 167.6 | 4 |
| 2C | 1 | 40 | 47.2 | 5 | 2.5 | 4.3 | 212.3 | " |
| 3 | 6 | 20 | 38.0 | 30 | 2.5 | 3.5 | 219.6 | " |
| 4 | 6 | 40 | 19.7 | 30 | 2.5 | 1.8 | 234.3 | " |
| 5 | 6 | 40 | 18.2 | 5 | 2.5 | 28.3 | 180.4 | " |
| 6C | 1 | 20 | 60.4 | 5 | 2.5 | 11.1 | 190.0 | " |
| 7C | 6 | 40 | 1.8 | 5 | 20 | 27.2 | 192.6 | " |
| 8C | 1 | 20 | 1.8 | 30 | 20 | 27.2 | 192.6 | " |
| 9C | 1 | 20 | 18.2 | 30 | 2.5 | 28.3 | 180.6 | " |
| 10C | 6 | 40 | 3.7 | 30 | 20 | 0.3 | 247.4 | " |
| 11C | 6 | 20 | 22.0 | 30 | 20 | 2.0 | 232.4 | " |
| 12C | 1 | 40 | 1.6 | 30 | 2.5 | 24.9 | 197.5 | " |
| 13C | 1 | 20 | 49.5 | 5 | 20 | 4.5 | 210.5 | " |
| 14 | 6 | 20 | 20.7 | 5 | 20 | 28.3 | 178.8 | " |
| 15C | 1 | 40 | 31.2 | 5 | 20 | 2.8 | 225.1 | " |
| 16C | 1 | 40 | 0.5 | 30 | 20 | 8.5 | 232.2 | " |
| 17C | 2 | 30 | 28 | 10 | 15 | 15 | 201.8 | " |
| 18 | 4 | 25 | 30 | 15 | 20 | 6 | 219.4 | " |
| 19C | 3 | 0 | 45 | 30 | 0 | 22 | 180.1 | " |
| 20* | 3 | 22.3 | 33 | 14.5 | 2.9 | 24.3 | 420.0 | " |
| 21C** | 0.8 | 31.7 | 28.8 | 3.0 | 11.9 | 23.8 | 291.0 | 5 |

| Run No. | Reaction Temperature (° C) | Solubility,° C, 20 % resin Magie 535 ink solvent | Amount of Resin Recovered, grams | Resin Yield %, (based on polymerizables) | Phenol Content of Resin Product, %[c] | Ethyl Cellulose Compatibility |
|---|---|---|---|---|---|---|
| 1 | 45–50 | 40 | 228.3 | 91.32 | 5.2 | clear, passes |
| 2C | " | 76 | 247.2 | 98.88 | 2.0 | Cloudy, incomp. |
| 3 | " | 34 | 172.9 | 69.16 | 2.3 | slightly cloudy, borderline pass |
| 4 | " | 2 | 203.0 | 81.20 | 3.5 | Hazy, borderline pass |
| 5 | " | 13 | 221.1 | 88.44 | 5.8 | Clear, passes |
| 6C | " | 93 | 248.7 | 99.48 | 1.7 | Cloudy, incomp. |
| 7C | " | 0 | 218.4 | 87.36 | 6.1 | clear, passes |
| 8C | " | −6 | 214.6 | 85.84 | 1.8 | cloudy, incomp. |
| 9C | " | −3 | 205.1 | 82.04 | 0.7 | cloudy, incomp. |
| 10C | " | 25 | 223.0 | 89.20 | 5.9 | clear, passes |
| 11C | " | 18 | 191.8 | 76.72 | 2.7 | cloudy, incomp. |
| 12C | " | −7 | 219.6 | 87.84 | 1.9 | cloudy, incomp. |
| 13C | " | 97 | 238.2 | 95.28 | 2.2 | cloudy, incomp. |
| 14 | " | 26 | 216.6 | 86.64 | 5.7 | clear, passes |
| 15C | " | 64 | 229.3 | 91.72 | 2.4 | cloudy, incomp. |
| 16C | " | 13 | 221.9 | 88.76 | 2.0 | cloudy, incomp. |

TABLE I-continued

| | | | | | | |
|---|---|---|---|---|---|---|
| 17C | " | 40 | 222.9 | 89.16 | 3.0 | cloudy, incomp. |
| 18 | " | 43 | 212.2 | 84.88 | 3.4 | clear, passes |
| 19C | " | 44 | 166.4 | 66.56 | 1.7 | cloudy, incomp. |
| 20 | " | — | 601.0 | 97.2 | 3.4 | clear, passes |
| 21C | 5-10 | 55 | 281.7 | 80.76 | 1.4 | cloudy, incomp. |

| Run No. | Ethyl Hydroxyethyl Cellulose Compatibility | Soft Point (R & B) ° C | Hydroxyl No. | Solution Viscosity (Gardner-Holdt sec.) | Color (Barrett visual) | Iodine No. | Std. Stoddard Solubility, ° C |
|---|---|---|---|---|---|---|---|
| 1 | clear, passes | 138 | 31.3 | 2.20 | 2½+ | 50.8 | 24 |
| 2C | clear, passes | 150 | 12.1 | 9.1 | 1¼+ | 26.2 | 52 |
| 3 | clear, passes | 240 | 13.7 | 1.15 | 2½ | 63.4 | 21 |
| 4 | clear, passes | 122.5 | 20.8 | 0.95 | 2+ | 67.1 | −14 |
| 5 | clear, passes | 120.5 | 34.8 | 1.00 | 3 | 46.8 | −6 |
| 6C | clear, passes | 141 | 10.4 | 13.0 | 1¼+ | 32.9 | 72 |
| 7C | clear, passes | 103 | 36.7 | 0.81 | 2½+ | 37.0 | −20 |
| 8C | clear, passes | 129.5 | 11.0 | 1.00 | 2½+ | 71.5 | −26 |
| 9C | clear, passes | 141 | 3.9 | 1.22 | 2+ | 75.1 | −20 |
| 10C | clear, passes | 115.5 | 35.0 | 0.90 | 2½+ | 56.0 | +8 |
| 11C | clear, passes | 126 | 15.9 | 0.95 | 1¼+ | 66.8 | +3 |
| 12C | clear, passes | 129 | 11.5 | 1.00 | 2½+ | 66.4 | −42 |
| 13C | cloudy, incomp. | 144 | 12.9 | 11.2 | 1¼+ | 27.8 | 73 |
| 14 | clear, passes | 120.5 | 33.9 | 1.00 | 2½+ | 42.7 | 8 |
| 15C | clear, passes | 140 | 14.3 | 4.00 | 1¼+ | 23.2 | 36 |
| 16C | clear, passes | 128.5 | 12.1 | 1.22 | 2½+ | 48.8 | −9 |
| 17C | clear, passes | 139 | 18.0 | 1.96 | 1¼ | 38.7 | 19 |
| 18 | clear, passes | 135 | 20.0 | 1.37 | ¾ | 44.2 | 23 |
| 19C | clear, passes | 150 | 10.3 | 1.89 | 1½+ | 69.9 | 22 |
| 20 | | 139 | 20.2 | 1.23 | 2½ | 68 | 0 |
| 21C | clear, passes | 152 | 8.6 | 4.50 | ½ | 20.9 | 30 |

[a] Reactants and concentration thereof in reaction mixture.
[b] Random hydrocarbon mixture consisting essentially of alpha-methyl styrene, dimethylstyrenes, coumarone, methylindenes, and a lesser proportion of unidentifiable $C_8$–$C_{12}$ monomers.
[c] Includes any resin-incorporated phenol from $BF_3 \cdot 2C_6H_5OH$ catalyst.
*1398 gram total reaction mix
**723.4 gram total reaction mix

EXAMPLE II

This example illustrates the preparation of gravure ink compositions from the resins of the present invention (runs 1, 3 to 5, and 18) and compares them with inks made from a resin outside the present invention (run 21C) and from a "UNIREZ" standard resin.

For each of these ink compositions, 50 parts by weight of a resin solution comprising 30% by weight of the resin in 42 KB gravure ink solvent was mixed with 18 parts by weight of Tolusol 25, 5 parts by weight of ethyl cellulose solution which comprised 20% by weight of ethyl cellulose in a toluene/ethanol solvent (containing 90% by volume toluene), 10 parts by weight "VM + P" naphtha, 2 parts by weight toluene, and 15 parts by weight Duplex Barium Lithol Red. This formulation was then ball milled for 16 hours in order to form a gravure ink composition.

The test results of these printing ink compositions are shown in TABLE II.

TABLE II

| Run No. | Drawdown (Meyer) | Wettability | Viscosity (No. 2 Zahn cup). secs. | Fineness (NPIRI) | Gloss % (ASTM D-523-67) |
|---|---|---|---|---|---|
| 1 | Excellent | Excellent | 35[b] | <0 | 2.7 |
| 3 | Good | Good | 35 | <0 | 2.3 |
| 4 | Good | Good | 21.5 | <0 | 2.0 |
| 5 | Excellent | Excellent | 32 | <0 | 3.0 |
| 18 | Good | Good | 25 | <0 | 4.0 |
| 21C | Fair[a] | Fair[a] | 32 | <0 | 4.3 |
| UNIREZ Std. | Excellent | Excellent | 24.5 | <0 | 4.3 |
| Blank Control | — | — | — | — | 5.0 |

[a] "Fair" designates not commercially acceptable.
[b] Initial viscosity 45 secs; added 42 KB solvent until viscosity reduced to 35 secs.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. An ethyl cellulose-compatible phenol-modified hydrocarbon resin having a polymerized indene content of from about 10% to about 70%, a polymerized vinyl toluene content of from about 10% to about 50%, and a polymerized dicyclopentadiene content of from about 5% to about 50%, and a polymerized phenol compound content of from about 1% to about 20%, wherein the polymerized indene, vinyl toluene, and dicyclopentadiene comprise above about 40% of the hydrocarbon resin, and wherein the phenol-modified hydrocarbon resin has a ring and ball softening point of above about 120° C, a solution viscosity (Gardner-Holdt, sec.) of from about 0.7 to about 15, a hydroxyl number of above about 10, and is both ethyl cellulose compatible and ethyl hydroxyethyl cellulose compatible.

2. The phenol-modified hydrocarbon resin of claim 1 wherein said resin has a color (Barrett scale) of not more than about 6, a standard Stoddard solubility of from between about −50, to about °50, and an iodine number of between about 25 and about 75.

3. The phenol-modified hydrocarbon resin of claim 1 wherein said resin has a polymerized indene content of from about 20% to about 40%, a polymerized vinyl toluene content of from about 20% to about 40%, a polymerized dicyclopentadiene content of from about 5% to about 30%, and a polymerized phenol compound content of from about 2% to about 10%.

4. An ethyl cellulose-compatible phenol-modified hydrocarbon resin having a polymerized indene content of from about 10% to about 50%, a polymerized vinyl toluene content of from about 20% to about 40%, a polymerized dicyclopentadiene content of from about 5% to about 30% and a polymerized phenol compound content of from about 2% to about 10%, wherein the polymerized indene, vinyl toluene, and dicyclopentadiene comprise at least about 60% of the hydrocarbon resin, and wherein the phenol-modified-hydrocarbon resin has a ring and ball softening point of above about 120° C, a solution viscosity (Gardner-Holdt, secs.) of from about 0.7 to about 15, a hydroxyl number of above about 20, and is both ethyl cellulose compatible and ethyl hydroxyethyl cellulose compatible.

5. The phenol-modified hydrocarbon resin of claim 4 wherein said resin has a color (Barrett scale) of not more than about 3, a standard Stoddard solubility of from between about −50 to about +25, and an iodine number of between about 30 and about 70.

6. An ethyl cellulose-compatible phenol-modified hydrocarbon resin for use in printing ink compositions having a polymerized indene content of from about 20% to about 40%, a polymerized vinyl toluene of from about 20% to about 40%, a polymerized dicyclopentadiene content of from about 5% to about 30%, and a polymerized phenol compound content of from 4% to about 8%, wherein the polymerized indene, vinyl toluene, and dicyclopentadiene comprise at least about 60% of the hydrocarbon resin, and wherein the phenol-modified hydrocarbon resin has a ring and ball softening point of above about 120° C, a iodine number of from about 30 to about 70, a hydroxyl number of above about 30, a resin color (Barrett scale) of not more than about 3, a standard Stoddard solubility of from between about 30 and about 70, a solution viscosity (Gardner-Holdt, sec) of between about 1.0 and about 5, and is both ethyl cellulose compatible and ethyl hydroxyethyl cellulose compatible.

* * * * *